(12) United States Patent
Mitchell

(10) Patent No.: US 8,631,449 B1
(45) Date of Patent: Jan. 14, 2014

(54) CELLULAR BASED AVIATION VIDEO SYSTEM

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/215,352

(22) Filed: Aug. 23, 2011

(51) Int. Cl.
*H04N 7/20* (2006.01)
*H04N 7/18* (2006.01)

(52) U.S. Cl.
USPC ............... 725/62; 725/76; 725/74; 725/77

(58) Field of Classification Search
None
See application file for complete search history.

(56) References Cited

U.S. PATENT DOCUMENTS

| | | | |
|---|---|---|---|
| 2002/0013150 A1* | 1/2002 | McKenna et al. | 455/430 |
| 2003/0200547 A1* | 10/2003 | Frisco et al. | 725/77 |
| 2006/0264242 A1* | 11/2006 | Dent | 455/562.1 |
| 2008/0263601 A1* | 10/2008 | Hebb et al. | 725/68 |
| 2009/0100476 A1* | 4/2009 | Frisco et al. | 725/68 |
| 2012/0009942 A1* | 1/2012 | Zoubir | 455/456.1 |

* cited by examiner

*Primary Examiner* — Robert Hance
(74) *Attorney, Agent, or Firm* — Donna P. Suchy; Daniel M. Barbieri

(57) ABSTRACT

An in-flight video system for providing video services to an aircraft is disclosed. The video system may include a receiving module positioned on an aircraft. The receiving module may be configured for: receiving video signals being broadcasted on a ground-based cellular network, processing the video signals received and providing a video stream. The video system may further include a processor communicatively connected to the receiving module. The processor may be configured for distributing the video stream to at least one end device onboard the aircraft.

14 Claims, 4 Drawing Sheets

CELLULAR BASED AVIATION VIDEO SYSTEM

CROSS-REFERENCE TO RELATED APPLICATIONS

This application is related to co-pending U.S. patent application Ser. No. 12/827,632 filed on Jun. 30, 2010 and entitled "Aviation Cellular Communications System and Method," which is incorporated herein by reference.

This application is also related to co-pending U.S. patent application Ser. No. 12/891,107 filed on Sep. 27, 2010 and entitled "Doppler Compensated Communications Link," which is incorporated herein by reference.

This application is further related to co-pending U.S. patent application Ser. No. 12/891,139 filed on Sep. 27, 2010 and entitled "Airborne Cell Tower Selection System and Method," which is incorporated herein by reference.

This application is further related to co-pending U.S. patent application Ser. No. 13/090,792 filed on Apr. 20, 2011 and entitled "Air-To-Ground Antenna," which is incorporated herein by reference.

This application further relates to co-pending and concurrently filed U.S. patent application Ser. No. 13/215,607, and entitled "Air-To-Ground Communications System and Method" listing James P. Mitchell as inventor, the entirety of which is incorporated herein by reference.

TECHNICAL FIELD

The present disclosure relates generally to communication systems and more particularly to an aircraft video receiver system.

BACKGROUND

Growing demand for delivery of video content poses one of the biggest challenges in mobile communications. Providing live video content may be even more challenging in certain situations. One example of such a situation is air travel, and it is becoming increasingly popular and necessary to provide in-flight video services to passengers and video teleconferencing for business travelers.

Certain aircraft satellite television systems have been developed to provide in-flight entertainment to passengers. Such systems may utilize antennas for receiving signals from satellites that provide television programming to passengers. While television programming may be provided utilizing such systems, they are very expensive to develop/operate. Furthermore, the satellites utilized for providing the television programming generally are the highest in EIRP (Effective Radiated Power) in order to close the link with inherently small antenna on the aircraft. Leasing high EIRP satellites is expensive.

Conventional ground-based cellular networks may provide a low-cost broadband option for delivery of video contents. Communication standards such as Long Term Evolution (LTE), 3GPP, UMTS, WiMax and other 4G and 5G type technologies may utilize next generation mobile broadcasting, variants or TCP to deliver live video over cellular networks. Therefore, it may be appreciated to provide the ability for an aircraft to seamlessly communicate with ground-based cellular networks to provide in-flight delivery of one or more video programs/channels.

SUMMARY

The present disclosure is directed to an in-flight video system for providing video services to an aircraft. The video system may include a receiving module positioned on an aircraft. The receiving module may be configured for: receiving video signals being broadcasted on a ground-based cellular network, processing the video signals received and providing a video stream. The video system may further include a processor communicatively connected to the receiving module. The processor may be configured for distributing the video stream to at least one end device onboard the aircraft.

In one embodiment of the present disclosure, if the ground-based cellular network is configured to broadcast the available video programs/channels separately, then multiple receivers may be utilized wherein each receiver is configured for receiving a particular video program. Alternatively, if the ground-based cellular network is configured to broadcast two or more programs jointly, the joint signals may be received and processed. The processor may selectively distribute one of the video programs to at least one end device onboard the aircraft.

A further embodiment of the present disclosure is directed to a method for providing video services on an aircraft. The method may include receiving video signals being broadcasted on a ground-based cellular network; processing the received video signals onboard the aircraft to provide a video stream; and distributing the video stream to at least one end device onboard the aircraft.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to a cellular based system and method for providing in-flight video services on an aircraft. One or more receiving modules positioned on the aircraft may be utilized to receive video signals that are being broadcasted on a ground-based cellular network. The cellular based in-flight video system in accordance with the present disclosure provides an alternative to satellite-based aircraft television systems (which may be more expensive to install and to operate).

Figure 1:
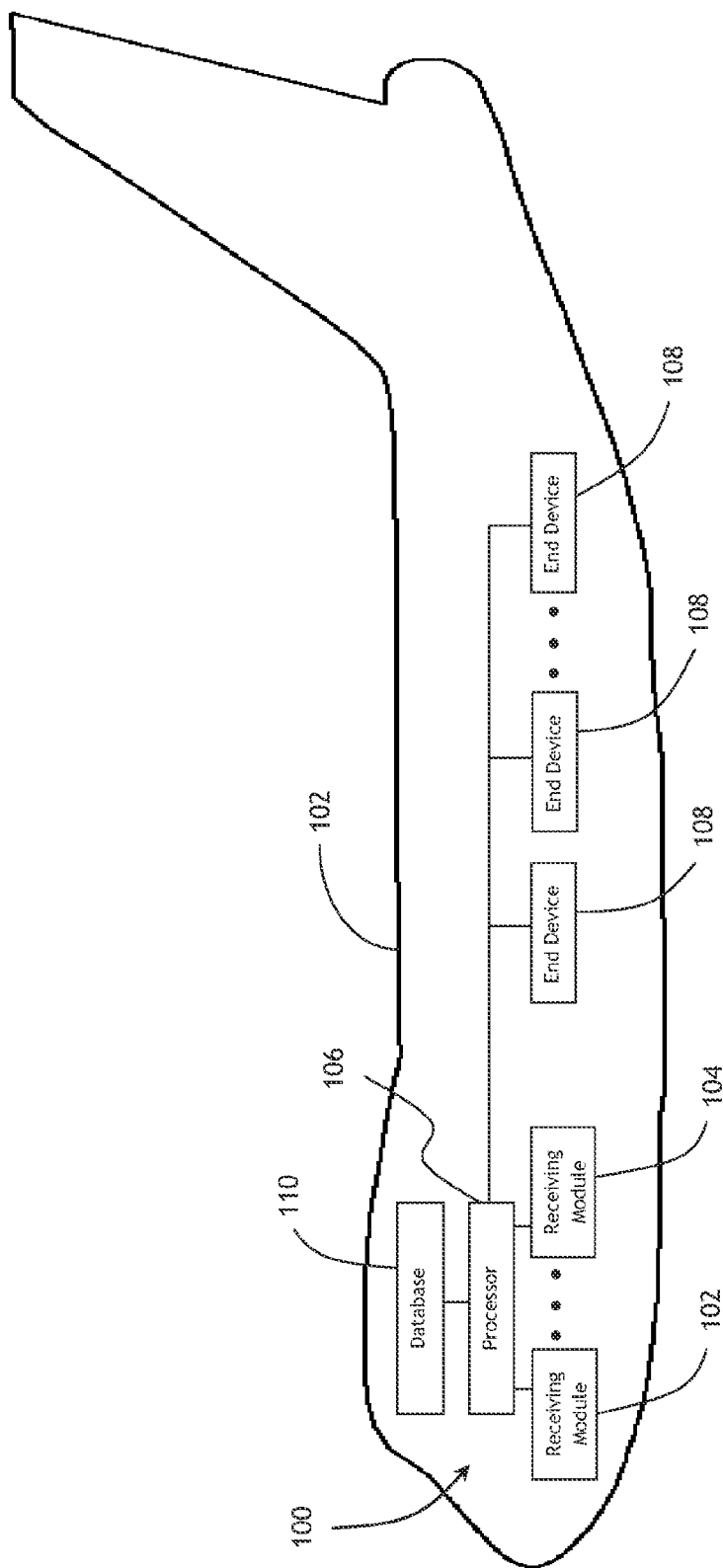
FIG. 1 is a block diagram illustrating an in-flight video system for providing video services to an aircraft.
Figure 2:
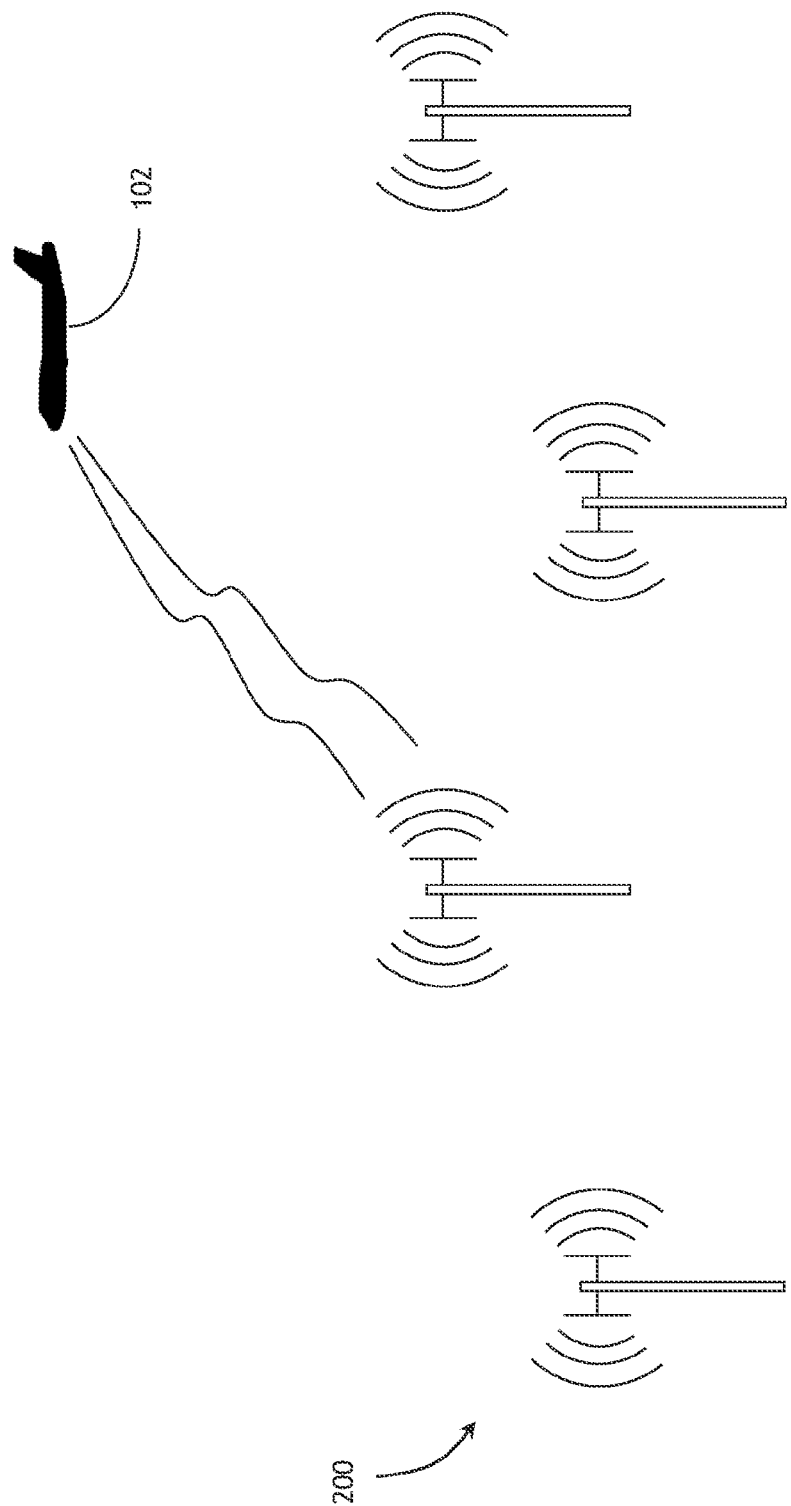
FIG. 2 illustrates the in-flight video system onboard the aircraft receiving broadcasting signals from a ground-based cellular network.

Referring generally to FIGS. 1 and 2. FIG. 1 shows a block diagram depicting an in-flight video system 100 capable of providing video services on an aircraft 102, and FIG. 2 is an illustration depicting the aircraft 102 and a ground-based cellular network 200 that is capable of broadcasting video signals. One or more receiving modules 104 may be located onboard the aircraft 102 for receiving and processing video signals that are being broadcasted on the ground-based cellular network 200. In one embodiment, the ground-based cellular network 200 may be any type of cellular network that is communicatively connected to one or more service/content providers and is capable of broadcasting video signals provided by these service/content providers. Such networks may include, for example, Long Term Evolution (LTE), 3GPP, UMTS, WiMax, other 4G and 5G type networks or the like. Additionally the RF bands of interest may be dedicated transmit bands or blocks in the 700 MHz region or any other cellular service areas.

Each receiving module 104 may be configured to process the received signals accordingly. For example, each receiving module 104 may include a radio frequency (RF) receiver for receiving the signals. The signals received may then go through a receiver modern, an error correction unit and a video decoder in order to produce the corresponding video stream. It is understood that various decoding, decompressing and/or other video processing steps may be applied to obtaining the video stream based on the received signals without departing from the spirit and scope of the present disclosure.

For instance, if a cellular network operator broadcasts video over its LTE network, then one or more LTE receiving modules 104 onboard the aircraft 102 may be utilized for receiving and processing the video signals that are being broadcasted. Each receiving module 104 may be configured for receiving video signals associated with a particular channel. That is, if the cellular network operator broadcasts n channels (i.e., video programs) over its LTE network, then up to n LTE receiving modules 104, each being associated with a particular channel, may be utilized in order to receive all available channels. However, it is contemplated that less than n receiving modules may utilized, in which case the in-flight video system 100 may receive fewer than all available channels. On the other hand, it is contemplated that more than n receiving modules may installed on the aircraft 102, in which case some of them may be utilized as backup modules (e.g., to provide redundancy for certain channels) and/or reserved modules (e.g., to be associated with additional channels or global implementation in the future). It is understood that the references to the LTE network and LTE receiving modules are merely exemplary. Various other types of networks and their compatible receivers/receiving modules may be utilized without departing from the spirit and scope of the present disclosure.

In one embodiment, the one or more receiving modules 104 may be communicatively connected to a processor 106 via wired or wireless communication means. The processor 106 may be implemented as a processing unit, a computing device, an integrated circuit, or any control logic (stand-alone or embedded) communicatively connected to the receiving module(s) 104. The processor 106 in turn is communicatively connected to one or more end devices 108 via wired or wireless communication means. The end devices 108 may include, for example, a video teleconferencing display, TV screen, a personal entertainment system, a video projector, or various display devices.

The processor 106 may determine a list of available video channels based on signals received by the receiving module(s) 104. The processor 106 may then provide the list of available channels to the end devices 108, allowing the users (e.g., passengers) of the end devices 108 to select from the available channels for viewing. When a particular channel is selected for an end device, that channel selection may be communicated to the processor 106. The processor 106 may then output and distribute the video signal received from the receiving module(s) associated with the selected channel to that user's end device. If the user subsequently changes the channel selection to another (second) channel, the new channel selection may be communicated to the processor 106. The processor 106 may then distribute the video signals received from another (second) receiving module(s) associated with the second channel to the user's end device. That is, the processor 106 may selectively distribute any available channel to any end device based on the corresponding channel selection.

It is contemplated that the processor 106 may be configured to improve the quality of video streams provided by the receiving modules 104. For example, the processor 106 may provide error resilient features similar to those utilized in certain video decoders (e.g., the H.264) to smooth the damaged or missing frames in the video streams before distributing to the end devices 108. In another example, the processor 106 may provide memory buffers and/or time delays to accommodate for potential latencies that may occur (e.g., due to cellular tower handoff or the like). However, such features may be deemed optional, and may be selectively implemented and/or engaged based on specific applications.

It may be appreciated that the exemplary embodiment described above is configured to be compatible with commercially available cellular network infrastructures. That is, the in-flight video system 100 may be utilized with no special requirement on the ground-based cellular network 200. It is contemplated, however, that a customized ground-based cellular network may also be utilized.

Figure 3:
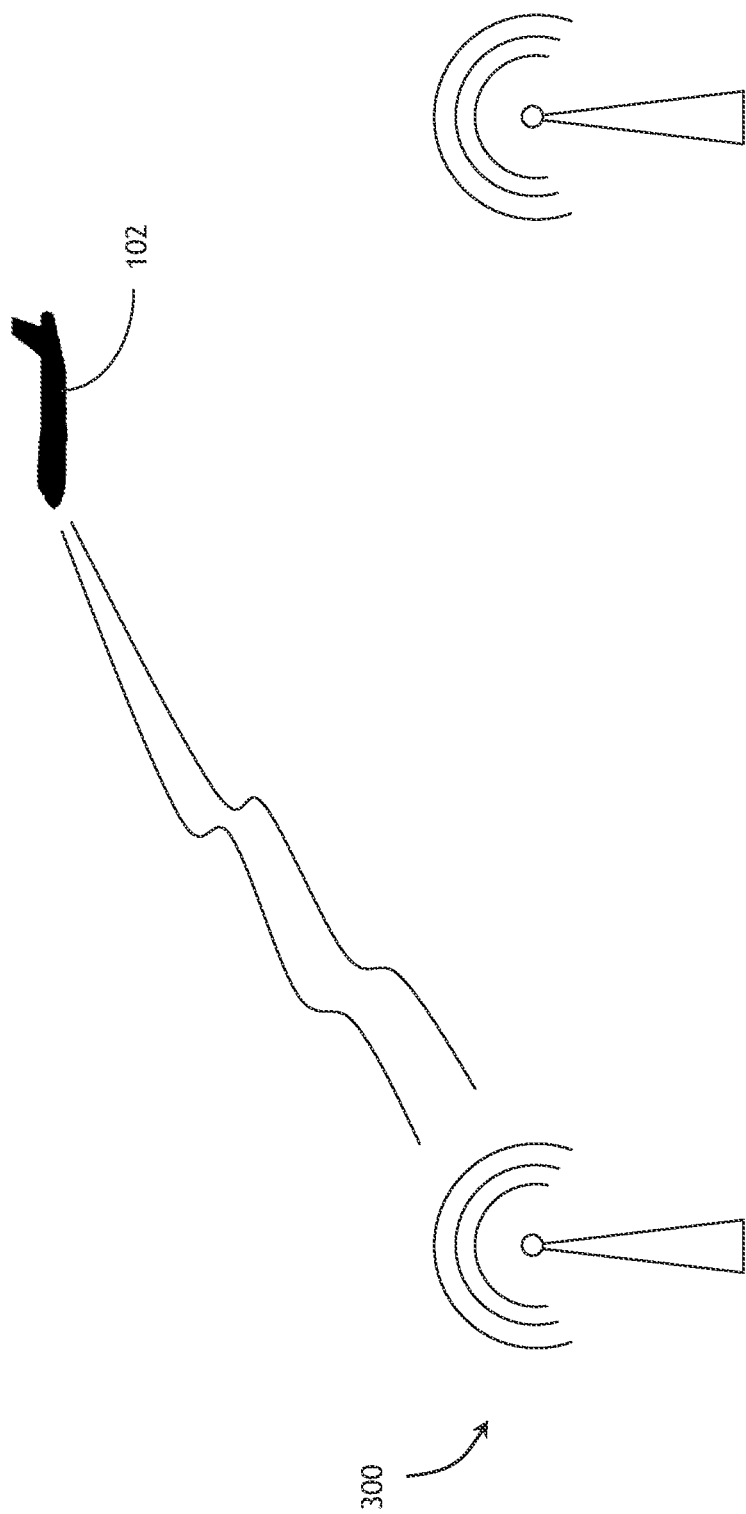
FIG. 3 illustrates the in-flight video system onboard the aircraft receiving broadcasting signals from a customized ground-based cellular network.

FIG. 3 is an illustration depicting the aircraft 102 and a customized ground-based cellular network 300. Similar to the commercially available cellular networks, the customized ground-based cellular network 300 may also be communicatively connected to one or more service/content providers and capable of broadcasting video signals provided by these service/content providers. However, the customized ground-based cellular network 300 may differ from the commercially available cellular networks in several aspects. For instance, the towers 302 in the customized ground-based cellular network 300 may be configured to broadcast their signals generally upwardly towards the sky to communicate with the aircraft during flight. The towers 302 may also be configured to broadcast with greater signal powers/gains (in comparison with conventional cellular towers), which may increase their bandwidth as well as coverage areas (thus less number of towers may be required).

In addition, a customized communication protocol may be implemented for video broadcasting. For example, the customized ground-based cellular network 300 may allow the towers 302 to broadcast multiple video channels jointly as combined signals, or a virtual channel. The virtual channel may be received by one receiving module 104 onboard the aircraft, and the receiving module 104 may process the virtual channel and split the virtual channel back to the original channels. Such a communication protocol may reduce the number of receiving modules 104 needed to support multi-channel broadcasting. For instance, if bandwidth permits, all available channels may be combined together to form a single virtual channel, in which case only one receiving module 104 may be required onboard the aircraft. The receiving module 104 may subsequently process the video signals associated with each original channel and provide a plurality of video streams to the processor 106 for distribution.

It is contemplated that various techniques may be utilized for combining and splitting the channels. For example, video data for a plurality of channels may be interleaved to form the combined virtual channel, and the processor may de-interleave the virtual channel to obtain the original channels. Other techniques may also be utilized without departing from the spirit and scope of the present disclosure. Furthermore, additional modifications/customizations may be implemented as well.

The receiving modules of the in-flight video system in accordance with the present disclosure may include any receivers configured for operating with a cellular network that is capable of providing video broadcasting. Such networks may include LTE, 3GPP, UMTS, WiMax, future communication standards or the like generally within the 698-3600 MHz spectrum region, commonly designated for commercial and public safety uses in the United States and other countries world-wide. Furthermore, receivers that are capable of providing directional beams and/or engaging with ground stations from an elevated position of the aircraft may be appreciated. For instance, an exemplary air-to-ground communication device, as disclosed in co-pending U.S. patent application Ser. No. 13/090,792 filed on Apr. 20, 2011 and entitled "Air-To-Ground Antenna," may be utilized onboard the aircraft to receive the broadcasting signals from the ground-based cellular networks.

It is contemplated that the in-flight video system 100 may be configured to selectively tune the receiver(s) to certain bands/frequencies based on the available ground stations and the location of the aircraft. For example, the locations of the ground stations and their broadcasting characteristics and directions may be known (e.g., provided by the cellular network operators) and stored in a database 110 communicatively connected to the video conferencing system and/or the in-flight video system 100. In addition, the current location and the direction of travel of the aircraft may also be determined utilizing a positioning system (e.g., a global positioning unit (GPS), an inertial navigation system (INS), or the like). Based on the current location and the direction of travel of the aircraft, the in-flight video system 100 may determine the available/visible ground stations and selectively tune the receiver(s) to certain bands/frequencies in order to maximize connectivity and minimize interferences. Such location based aircraft to cellular network communication systems are disclosed in co-pending U.S. patent application Ser. No. 12/891,139 filed on Sep. 27, 2010 and entitled "Airborne Cell Tower Selection System and Method," which is incorporated herein by reference.

Furthermore, when operating in an aircraft environment, broadcasting signals received by the receivers) may be affected by a Doppler frequency shift given the relatively high speed of the aircraft in relation to the fixed node (cellular tower) with which the receiver(s) are in communication. Therefore, it may be appreciated that the in-flight video system 100 may be further configured to compensate for a Doppler frequency shift in communication between a receiver and a cellular tower. An exemplary system and method for compensating for a Doppler frequency shift in air-to-ground communications is disclosed in co-pending U.S. patent application Ser. No. 12/891,107 filed on Sep. 27, 2010 and entitled "Doppler Compensated Communications Link," which is incorporated herein by reference. Such a technique allows for more stable communications, faster acquisition, and higher order modulation and data rates.

Figure 4:
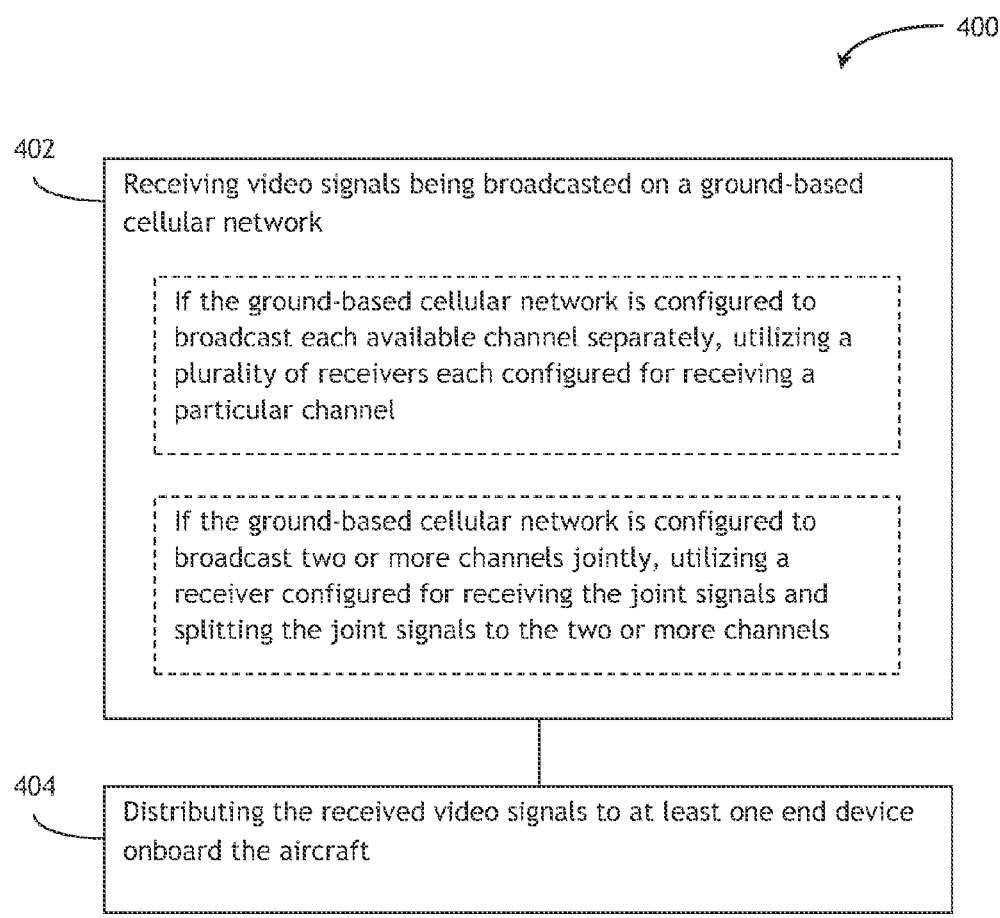
FIG. 4 is a flow chart illustrating a method for providing video services on an aircraft.

Referring now to FIG. 4, a method 400 for providing video services on an aircraft is shown. The method 400 may be implemented as a part of the in-flight video system onboard the aircraft. For instance, step 402 may receive video signals being broadcasted on a ground-based cellular network. As described above, the ground-based cellular network may be any type of cellular network that is capable of providing video broadcasting, including commercially available cellular networks or customized cellular networks.

In one embodiment, if the ground-based cellular network is configured to broadcast each available channel separately, then multiple receiving modules may be utilized wherein each receiving module is configured for receiving and processing a particular channel. Alternatively, if the ground-based cellular network is configured to broadcast two or more channels jointly, then fewer numbers of receiving modules may be required, and the joint signals may be processed by the in-flight video system to obtain the original channels. Step 404 may then selectively distribute the processed video streams to one or more end devices onboard the aircraft as described above.

The method and system in accordance with the present disclosure may be utilized to provide video services for various purposes. In addition to providing in-flight entertainment to passengers, other video services may include, but not limited to, video teleconferencing (e.g., for business jets or the like), flight deck video/data display (e.g., weather radar images from radar on the ground or other aircrafts), as well as other video services not specifically referenced.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. An in-flight video system, comprising:
   a first receiving module positioned on an aircraft, the first receiving module configured for: receiving video signals for a first channel program being broadcasted on a ground-based cellular network, processing the video signals received for the first channel program and providing a first video stream;
   a second receiving module positioned on the aircraft, the second receiving module configured for: receiving video signals for a second channel program being broadcasted on the ground-based cellular network, processing the video signals received for the second channel program and providing a second video stream, wherein the first receiving module and the second receiving module are configured to simultaneously receive video signals for the first channel program and the second channel program, and process the received video signals to provide the first video stream for the first channel program and the second video stream for the second channel program, and wherein the first channel program is different from the second channel program; and a processor communicatively connected to the first receiving module, the second receiving module and at least one end device onboard the aircraft, the processor configured for: receiving a channel selection from the at least one end device and distributing at least one of the first channel program and the second channel program to the at least one end device based on the channel selection.

2. The in-flight video system of claim 1, wherein at least one of the first receiving module and the second receiving module is configured for: receiving video signals for a plurality of channels as combined signals, processing the video signals received and providing a plurality of video streams.

3. The in-flight video system of claim 1, further comprising:
a database configured for providing position information of a plurality of cellular towers in the ground-based cellular network;
wherein the first receiving module and the second receiving module are configured for receiving broadcasting from at least one cellular tower selected based on the position information of the cellular towers and a position of the aircraft.

4. The in-flight video system of claim 1, further comprising:
a database configured for providing position information of a plurality of cellular towers in the ground-based cellular network;
wherein the processor is further configured for performing Doppler correction on the received video signals based on: the position information of the cellular towers, a position of the aircraft and a speed of the aircraft.

5. A system for providing video services to an aircraft, the system comprising:
a ground-based cellular network having a plurality of cellular towers, each of the plurality of cellular towers capable of broadcasting video signals;
a first receiving module positioned on the aircraft, the first receiving module configured for: receiving video signals for a first channel program being broadcasted on the ground-based cellular network, processing the video signals received for the first channel program and providing a first video stream;
a second receiving module positioned on the aircraft, the second receiving module configured for: receiving video signals for a second channel program being broadcasted on the ground-based cellular network, processing the video signals received for the second channel program and providing a second video stream, wherein the first receiving module and the second receiving module are configured to simultaneously receive video signals for the first channel program and the second channel program, and process the received video signals to provide the first video stream for the first channel program and the second video stream for the second channel program, and wherein the first channel program is different from the second channel program; and
a processor communicatively connected to the first receiving module, the second receiving module and at least one end device onboard the aircraft, the processor configured for: receiving a channel selection from the at least one end device and distributing at least one of the first channel program and the second channel program to the at least one end device based on the channel selection.

6. The system of claim 5, wherein
at least one of the first receiving module and the second receiving module is configured for: receiving video signals for a plurality of channels as combined signals, processing the video signals received and providing a plurality of video streams.

7. The system of claim 5, further comprising:
a database configured for providing position information of the plurality of cellular towers in the ground-based cellular network;
wherein the first receiving module and the second receiving module are configured for receiving broadcasting from at least one cellular tower selected based on the position information of the cellular towers and a position of the aircraft.

8. The system of claim 5, further comprising:
a database configured for providing position information of the plurality of cellular towers in the ground-based cellular network;
wherein the processor is further configured for performing Doppler correction on the received video signals based on: the position information of the cellular towers, a position of the aircraft and a speed of the aircraft.

9. The system of claim 5, wherein the ground-based cellular network is configured for broadcasting video signals generally upwardly towards the sky.

10. A method for providing video services on an aircraft, the method comprising:
simultaneously receiving video signals for a first channel program and a second channel program being broadcasted on a ground-based cellular network, further comprising:
utilizing a first receiving module onboard the aircraft to receive video signals associated with the first channel program, the first receiving module further configured for processing the received video signals associated with the first channel program and providing the first video stream; and
utilizing a second receiver onboard the aircraft to receive video signals associated with the second channel program, the second receiving module further configured for processing the received video signals associated with the second channel program and providing the second video stream, wherein the second channel program is different from the first channel program;
processing the received video signals and providing a first video stream for the first channel program and a second video stream for the second channel program;
receiving a channel selection from at least one end device onboard the aircraft; and
distributing at least one of the first video stream and the second video stream to the at least one end device based on the channel selection.

11. The method of claim 10, wherein receiving video signals being broadcasted on a ground-based cellular network further comprises:
utilizing a receiver onboard the aircraft to receive video signals associated with a plurality of channels as combined signals;
processing the received video signals associated with the plurality of channels and providing a first video stream for the first channel program and a second video stream for the second channel program.

12. The method of claim 10, further comprising:
providing position information of a plurality of cellular towers in the ground-based cellular network; and
receiving broadcasting from at least one cellular tower selected based on: the position information of the cellular towers and a position of the aircraft.

13. The method of claim 10, further comprising:
providing position information of a plurality of cellular towers in the ground-based cellular network; and
performing Doppler correction on the received video signals based on: the position information of the cellular towers, a position of the aircraft and a speed of the aircraft.

14. The method of claim 10, wherein the ground-based cellular network is configured for broadcasting video signals generally upwardly towards the sky.

* * * * *